US008267565B2

(12) United States Patent
Pan

(10) Patent No.: US 8,267,565 B2
(45) Date of Patent: Sep. 18, 2012

(54) LED ILLUMINATION DEVICE AND LED ILLUMINATION MODULE FOR GENERATING UNIFORM STRIPPED LIGHT SOURCE

(76) Inventor: Wen-Shin Pan, Taipei (TW)

( * ) Notice: Subject to any disclaimer, the term of this patent is extended or adjusted under 35 U.S.C. 154(b) by 426 days.

(21) Appl. No.: 12/571,716

(22) Filed: Oct. 1, 2009

(65) Prior Publication Data

US 2010/0284182 A1 Nov. 11, 2010

(30) Foreign Application Priority Data

May 11, 2009 (TW) ................................ 98208050 U

(51) Int. Cl.
*F21V 7/04* (2006.01)

(52) U.S. Cl. ........ 362/625; 362/610; 362/612; 362/613; 362/624; 362/634

(58) Field of Classification Search .................. 362/610, 362/612, 613, 623, 624, 625, 26, 219, 551, 362/555, 558, 634
See application file for complete search history.

(56) References Cited

U.S. PATENT DOCUMENTS 6,474,826 B1 * 11/2002 Tanaka et al. ................ 362/612
8,070,340 B2 * 12/2011 Kabuki et al. ................. 362/551
8,070,341 B2 * 12/2011 Chinniah et al. ............. 362/551

* cited by examiner

*Primary Examiner* — Thomas Sember
(74) *Attorney, Agent, or Firm* — Muncy, Geissler, Olds & Lowe, PLLC

(57) ABSTRACT

An LED illumination module for generating uniform stripped light source includes a stripped light-guiding unit, a stripped reflective unit and a light-emitting unit. The stripped light-guiding unit has a light-guiding body and a plurality of first light-guiding microstructures disposed on a top side of the light-guiding body. Each first light-guiding microstructure has a first reflective index. The stripped reflective unit has a reflective body corresponding to the light-guiding body and a reflective layer formed on an inner surface of the reflective body. The stripped reflective unit covers one part of the light-guiding body, the first light-guiding microstructures are disposed between the light-guiding body and the reflective layer, and the reflective layer has a second reflective index that is different from the first reflective index. The light-emitting unit has a first light-emitting module disposed beside one end of the light-guiding body.

14 Claims, 12 Drawing Sheets

2a
20a 21a
30a
303a 300a 301a
302a 304a
1a
11a
10a
3a

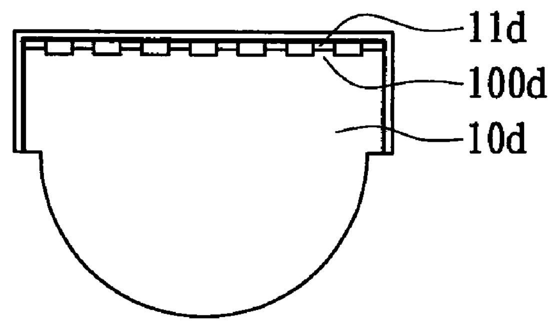
FIG. 5
1e
12e
10e
FIG. 6
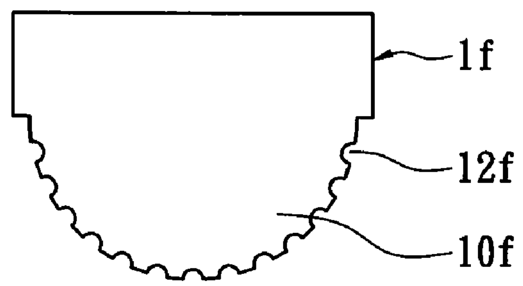
FIG. 7

LED ILLUMINATION DEVICE AND LED ILLUMINATION MODULE FOR GENERATING UNIFORM STRIPPED LIGHT SOURCE

BACKGROUND OF THE INVENTION

1. Field of the Invention

The present invention relates to an LED illumination device and an LED illumination module, in particular, to an LED illumination device and an LED illumination module for generating uniform stripped light source.

2. Description of Related Art

Referring to FIG. 1A, the LED lamp of the prior art includes a circuit substrate 1 and a plurality of LEDs 2 serially and electrically disposed on the circuit substrate 1. When the LEDs 2 is lighting up, the LED lamp can generate a luminous efficiency similar to daylight lamp. However, the LEDs 2 are separated from each other, so that light beams generated by the LEDs 2 are not uniform. For example, the area of the light source intensity under each LED 2 is strong as the positions of hidden line, and the area of the light source intensity between each two LEDs 2 is weak. Hence, the LED lamp of the prior art can not generate uniform illumination. In addition, the LED lamp of the prior art can generate strong light beams, so that user can not direct sight the LED lamp.

In order to solve the questions of "non-uniform illumination" and "user can not direct sight the LED lamp", the designer usually adds a transparent lampshade (not shown) under the LED lamp in order to uniform the light beams and decrease the light source intensity. However, this way would decrease the light-emitting efficiency of the LED lamp.

Moreover, referring to FIGS. 1B and 1C, the prior art provides a light-emitting module that includes a light-guiding bar 3 and an LED 4 disposed beside the light-guiding bar 3. The light beams L generated by the LED 4 projects to the light-guiding bar 3, and then the light beams L are guided by the light-guiding bar 3 to generate downward light-projecting effect. However, referring to FIG. 1C, the light beams L are guided by the light-guiding bar 3 to generate a downward light-projecting area A shown as the hidden line and the downward light-projecting area A has a narrow illumination range, so that the light-emitting module of the prior art can not provides an extensive illumination range.

SUMMARY OF THE INVENTION

In view of the aforementioned issues, the present invention provides an LED illumination device and an LED illumination module for generating uniform stripped light source. The present invention can generate uniform and glareless bar-shaped light source by using a light-guiding element and a light-reflecting element, and the light-guiding element has one reflective index that is different from another reflective index of the light-reflecting element.

To achieve the above-mentioned objectives, the present invention provides an LED illumination device for generating uniform stripped light source, including: a stripped light-guiding unit, a stripped reflective unit, a fixing unit and a light-emitting unit. The stripped light-guiding unit has a light-guiding body and a plurality of first light-guiding microstructures disposed on a top side of the light-guiding body. The light-guiding body has at least two first retaining portions, and each first light-guiding microstructure has a first reflective index. The stripped reflective unit has a reflective body corresponding to the light-guiding body and a reflective layer formed on an inner surface of the reflective body. The stripped reflective unit covers one part of the light-guiding body, the first light-guiding microstructures are disposed between the light-guiding body and the reflective layer, and the reflective layer has a second reflective index that is different from the first reflective index. The fixing unit has at least one fixing body and at least two second retaining portions extended downwards from the fixing body. The position of the stripped light-guiding unit relative to the fixing unit is fixed by matching the two first retaining portions and the two second retaining portions. The light-emitting unit has a first light-emitting module disposed beside one end of the light-guiding body.

In order to further understand the techniques, means and effects the present invention takes for achieving the prescribed objectives, the following detailed descriptions and append portioned drawings are hereby referred, such that, through which, the purposes, features and aspects of the present invention can be thoroughly and concretely appreciated; however, the append portioned drawings are merely provided for reference and illustration, without any intention to be used for limiting the present invention.

BRIEF DESCRIPTION OF THE DRAWINGS

FIG. 5 is a lateral, schematic view of the LED illumination module according to the fourth embodiment of the present invention;

FIG. 6 is a lateral, schematic view of the LED illumination module according to the fifth embodiment of the present invention;

FIG. 7 is a lateral, schematic view of the LED illumination module according to the sixth embodiment of the present invention;

DETAILED DESCRIPTION OF THE PREFERRED EMBODIMENTS

Figure 2A:
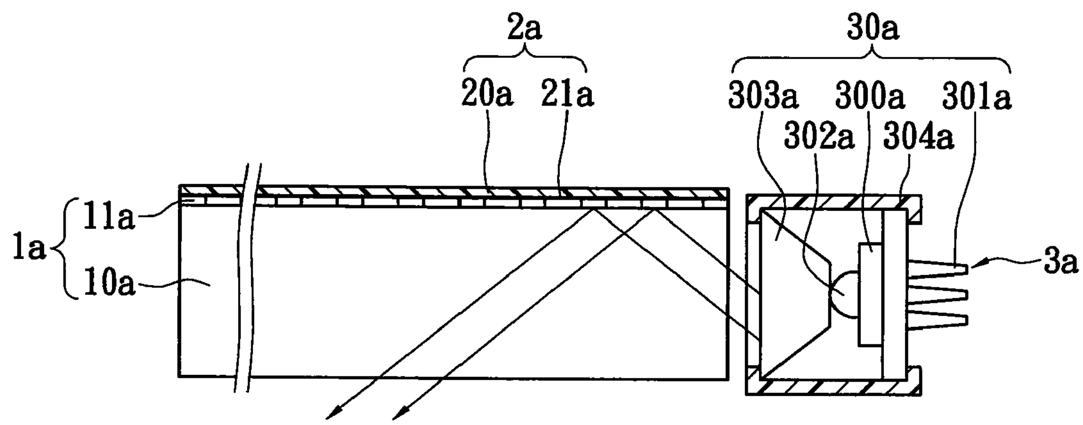
FIG. 2A is a front, schematic view of the LED illumination module according to the first embodiment of the present invention.
Figure 2B:
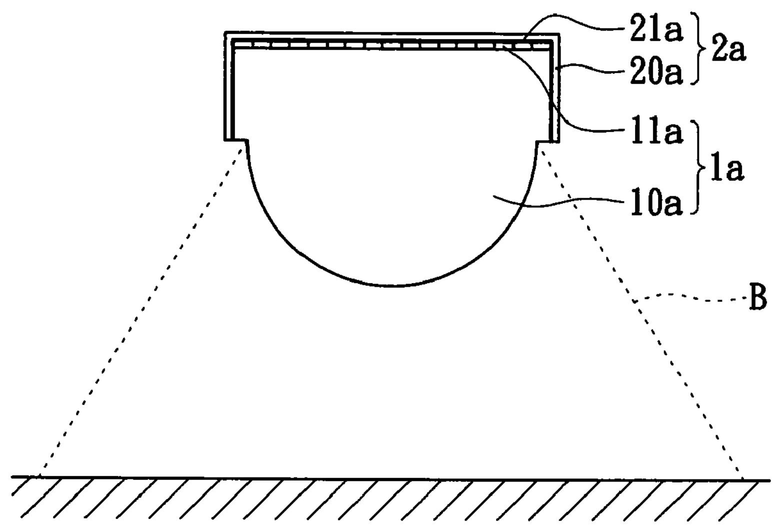
FIG. 2B is a lateral, schematic view of the LED illumination module according to the first embodiment of the present invention.
Figure 2C:
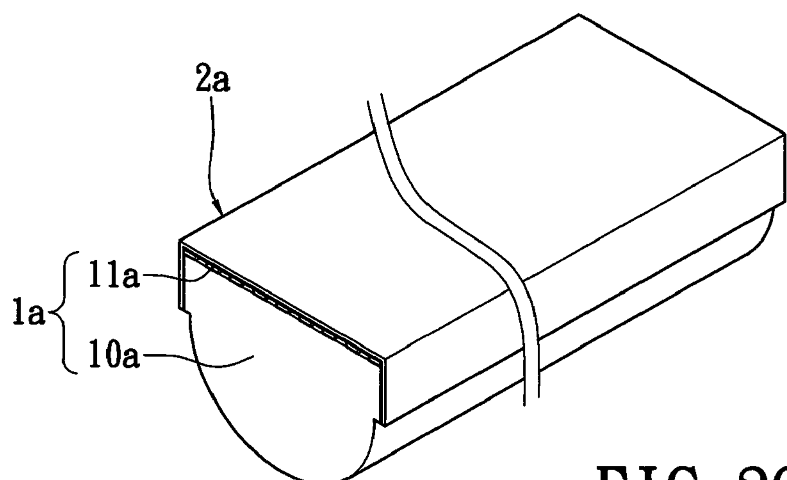
FIG. 2C is a perspective, schematic view of the LED illumination module according to the first embodiment of the present invention.

Referring to FIGS. 2A to 2C, the first embodiment of the present invention provides an LED illumination module for generating uniform stripped light source, including a stripped light-guiding unit 1*a*, a stripped reflective unit 2*a* and a light-emitting unit 3*a*.

The stripped light-guiding unit 1*a* has a light-guiding body 10*a* and a plurality of first light-guiding microstructures 11*a* disposed on a top side of the light-guiding body 10*a* (the first light-guiding microstructures 11*a* are projected on the top side of the light-guiding body 10*a*), and each first light-guiding microstructure 11*a* has a first reflective index. In addition, the first light-guiding microstructures 11*a* can be convex dot-shaped light-guiding microstructures that are integratedly formed on the top side of the light-guiding body 10*a* or are formed on the top side of the light-guiding body 10*a* by other forming method according to different requirements.

The stripped reflective unit 2*a* has a reflective body 20*a* corresponding to the light-guiding body 10*a* and a reflective layer 21*a* formed on an inner surface of the reflective body 20*a*. In addition, the stripped reflective unit 2*a* covers one part of the light-guiding body 10*a* (the top part of the light-guiding body 10*a* is covered by the stripped reflective unit 2*a* as shown in FIG. 2B). The first light-guiding microstructures 11*a* are disposed between the light-guiding body 10*a* and the reflective layer 21*a*, and the reflective layer 21*a* has a second reflective index that is different from the first reflective index. Hence, the first reflective index of the first light-guiding microstructures 11*a* is different from the second reflective index of the reflective layer 21*a*. However, the present invention can add another light-guiding microstructures with another reflective index different from the first reflective index and the second reflective index between the stripped light-guiding unit 1*a* and the stripped reflective unit 2*a*.

Referring to FIG. 2B, light beams generated by the light-emitting unit 3*a* are guided by the stripped light-guiding unit 1*a* and reflected by the stripped reflective unit 2*a* to form a downward light-projecting area B that has an extensive illumination range. Hence, the present invention has an extensive illumination range than the prior art.

The light-emitting unit 3*a* has a first light-emitting module 30*a* disposed beside one end (one short side) of the light-guiding body 10*a*. In addition, the first light-emitting module 30*a* has a first substrate 300*a*, a first heat-dissipating element 301*a* disposed on a bottom side of the first substrate 300*a*, at least one first light-emitting element 302*a* (such as one or more LED chips) electrically disposed on the first substrate 300*a* and facing the light-guiding body 10*a*, a first lens 303*a* disposed between the light-guiding body 10*a* and the first light-emitting element 302*a*, and a first casing 304*a* for enclosing the first substrate 300*a*, the first heat-dissipating element 301*a*, the first light-emitting element 302*a* and the first lens 303*a*. Moreover, one side of the first heat-dissipating element 301*a* and one side of the first lens 303*a* are exposed by two opposite openings of the first casing 304*a*, and the two openings respectively are a heat-dissipating opening for the first heat-dissipating element 301*a* and a light-projecting opening for the first light-emitting element 302*a*. In addition, the first lens 303*a* is not a necessary component. Hence, the first lens 303*a* can be selectively used in the first light-emitting module 30*a* according to different requirements.

Figure 2D:
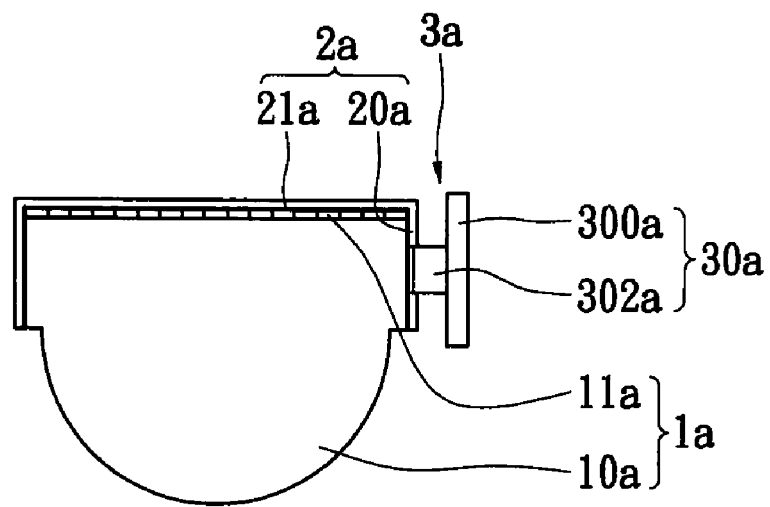
FIG. 2D is a lateral, schematic view of the LED illumination module according to another first embodiment of the present invention.

Referring to FIG. 2D, the light-emitting unit 3*a* has at least one light-emitting module 30*a* disposed beside one long side of the light-guiding body 10*a*, and the light-emitting module 30*a* has a substrate 300*a* and a plurality of light-emitting elements 302*a* electrically disposed on the substrate 300*a*. Hence, light beams generated by the light-emitting elements 302*a* can be projected onto the long side of the light-guiding body 10*a*.

Figure 2E:
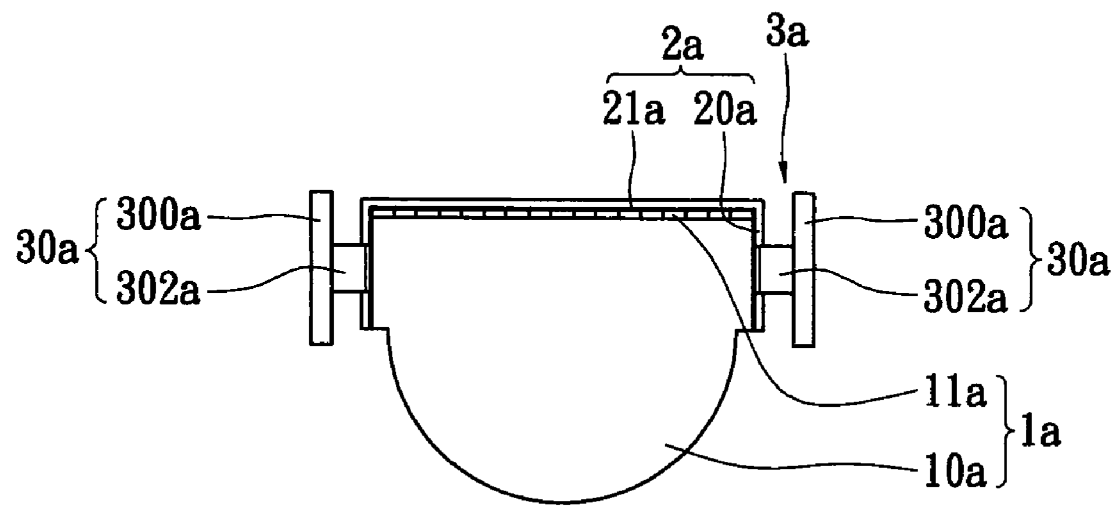
FIG. 2E is a lateral, schematic view of the LED illumination module according to another first embodiment of the present invention.

Referring to FIG. 2E, the light-emitting unit 3*a* has at least two light-emitting modules 30*a* disposed beside two opposite long sides of the light-guiding body 10*a*, and each light-emitting module 30*a* has a substrate 300*a* and a plurality of light-emitting elements 302*a* electrically disposed on the substrate 300*a*. Hence, light beams generated by the light-emitting elements 302*a* of the two light-emitting modules 30*a* can be projected onto the two opposite long sides of the light-guiding body 10*a*.

Figure 3:
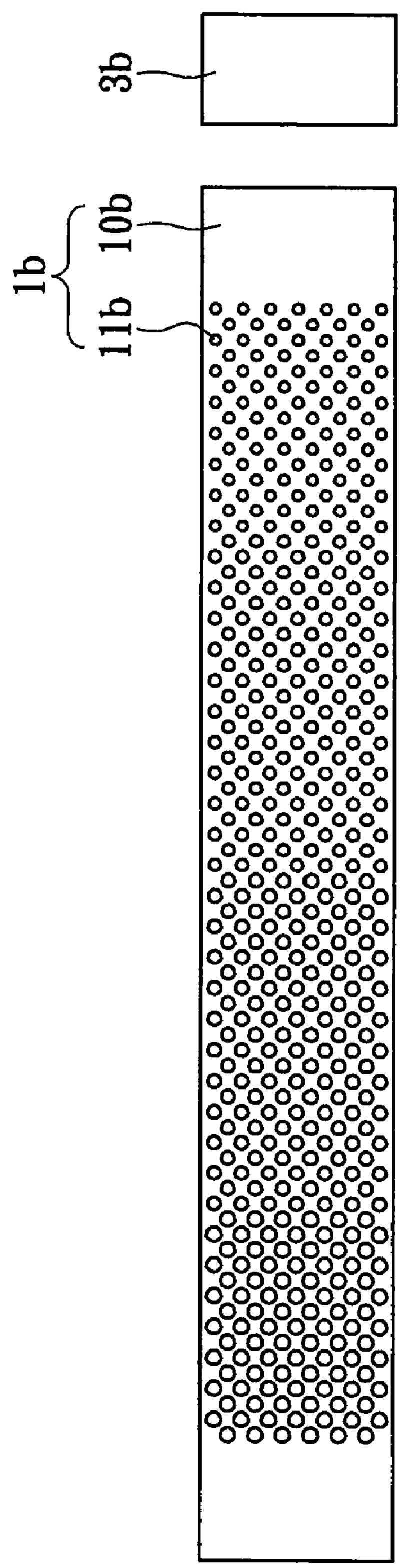
FIG. 3 is a top, schematic view of the LED illumination module according to the second embodiment of the present invention (the stripped reflective unit is not shown)

Referring to FIG. 3 (the stripped reflective unit is not shown), the difference between the second embodiment and the first embodiment is that: in the second embodiment, the first light-guiding microstructures 11*b* are convex dot-shaped light-guiding microstructures that are integratedly or subsequently formed on the top side of the light-guiding body 10*b*, and the density of the convex dot-shaped light-guiding microstructures are increased gradually along predetermined directions far away from the light-emitting unit 3*b*. In addition, the convex dot-shaped light-guiding microstructures are arranged alternately, so that the light beams generated by the light-emitting unit 3*b* can be uniformly guided out by the convex dot-shaped light-guiding microstructures. However, the above-mentioned definition does not limit the present invention, for example, the sizes of the convex dot-shaped light-guiding microstructures can be increased gradually along predetermined directions far away from the light-emitting unit 3*b*.

Figure 4:
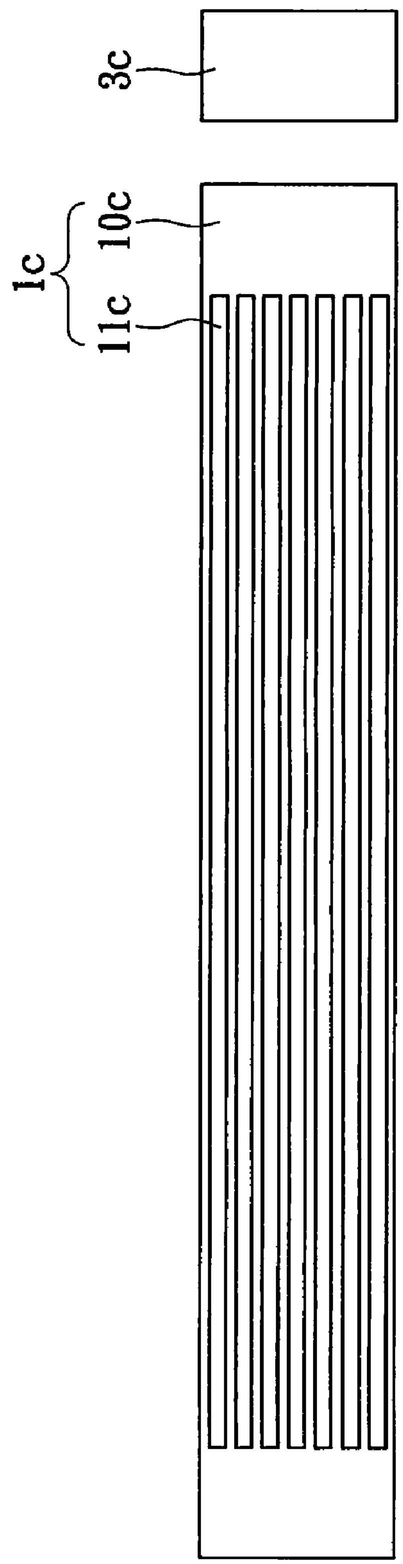
FIG. 4 is a top, schematic view of the LED illumination module according to the third embodiment of the present invention (the stripped reflective unit is not shown)

Referring to FIG. 4 (the stripped reflective unit is not shown), the difference between the third embodiment and the above-mentioned embodiments is that: in the third embodiment, the first light-guiding microstructures 11*c* are convex strip-shaped light-guiding microstructures that are integratedly or subsequently formed on the top side of the light-guiding body 10c. Each convex strip-shaped light-guiding microstructure can be continuous or discontinuous, and the convex strip-shaped light-guiding microstructures can be parallel to each other. In addition, the width of each convex strip-shaped light-guiding microstructure can be increased gradually along a predetermined direction far away from the light-emitting unit 3c according to different requirements. Hence, the light beams generated by the light-emitting unit 3c can be uniformly guided out by the convex strip-shaped light-guiding microstructures.

Referring to FIG. 5, the difference between the fourth embodiment and the above-mentioned embodiments is that: in the fourth embodiment, the light-guiding body 10d has a plurality of micro protrusions 100d, and the first light-guiding microstructures 11d are respectively disposed on the micro protrusions 100d. Of course, each first light-guiding microstructure 11d can be filled out concave groove or dot between each two micro protrusions 100d.

Referring to FIG. 6, the difference between the fifth embodiment and the above-mentioned embodiments is that: in the fifth embodiment, the stripped light-guiding unit 1e has a plurality of second light-guiding microstructures 12e convexly disposed on a bottom side of the light-guiding body 10e. In addition, the second light-guiding microstructures 12e are convex dot-shaped light-guiding microstructures, and the density of the convex dot-shaped light-guiding microstructures are increased gradually along predetermined directions far away from the light-emitting unit (not shown). In addition, the convex dot-shaped light-guiding microstructures are arranged alternately, so that the light beams generated by the light-emitting unit can be uniformly guided out by the convex dot-shaped light-guiding microstructures of the stripped light-guiding unit 1e. However, the above-mentioned definition does not limit the present invention, for example, the sizes of the convex dot-shaped light-guiding microstructures can be increased gradually along predetermined directions far away from the light-emitting unit.

Referring to FIG. 7, the difference between the sixth embodiment and the fifth embodiment is that: in the sixth embodiment, the stripped light-guiding unit 1f has a plurality of second light-guiding microstructures 12f concavely disposed on a bottom side of the light-guiding body 10f. In addition, the second light-guiding microstructures 12f are concave dot-shaped light-guiding microstructures, and the density of the concave dot-shaped light-guiding microstructures are increased gradually along predetermined directions far away from the light-emitting unit (not shown). In addition, the concave dot-shaped light-guiding microstructures are arranged alternately, so that the light beams generated by the light-emitting unit can be uniformly guided out by the concave dot-shaped light-guiding microstructures of the stripped light-guiding unit 1f. However, the above-mentioned definition does not limit the present invention, for example, the sizes of the concave dot-shaped light-guiding microstructures can be increased gradually along predetermined directions far away from the light-emitting unit.

Figure 8:
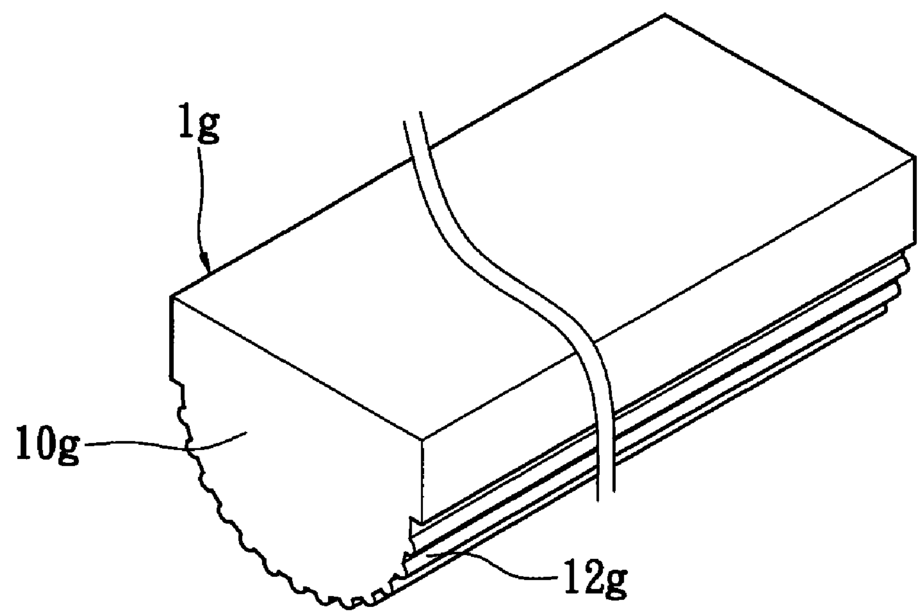
FIG. 8 is a perspective, schematic view of the LED illumination module according to the seventh embodiment of the present invention.

Referring to FIG. 8, the difference between the seventh embodiment and the fifth embodiment is that: in the seventh embodiment, the stripped light-guiding unit 1g has a plurality of second light-guiding microstructures 12g convexly disposed on a bottom side of the light-guiding body 10g. In addition, the second light-guiding microstructures 12g are convex strip-shaped light-guiding microstructures, and the convex strip-shaped light-guiding microstructures are parallel to each other. Moreover, the width of each convex strip-shaped light-guiding microstructure can be increased gradually along predetermined directions far away from the light-emitting unit (not shown) according to different requirements.

Figure 9A:
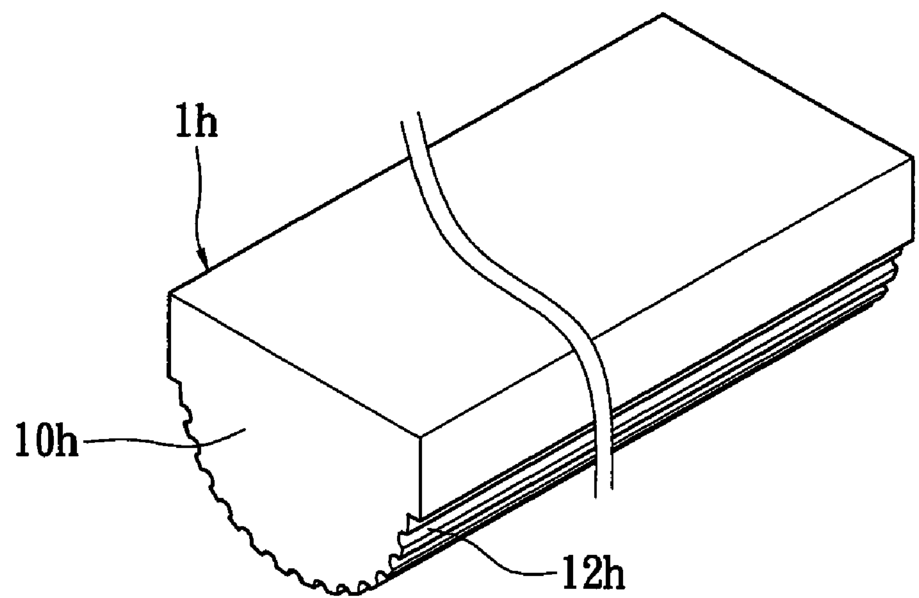
FIG. 9A is a perspective, schematic view of the LED illumination module according to the eighth embodiment of the present invention.

Referring to FIG. 9A, the difference between the eighth embodiment and the seventh embodiment is that: in the eighth embodiment, the stripped light-guiding unit 1h has a plurality of second light-guiding microstructures 12h concavely disposed on a bottom side of the light-guiding body 10h. In addition, the second light-guiding microstructures 12h are concave strip-shaped light-guiding microstructures, and the concave strip-shaped light-guiding microstructures are parallel to each other. Moreover, the width of each concave strip-shaped light-guiding microstructure can be increased gradually along predetermined directions far away from the light-emitting unit (not shown) according to different requirements.

Figure 9B:
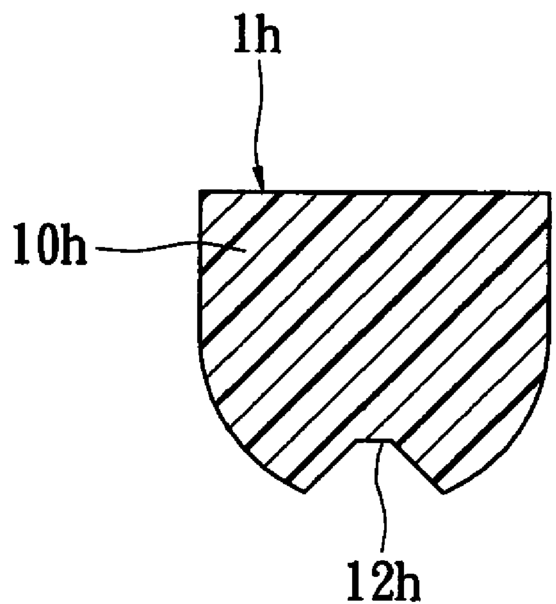
FIG. 9B is a perspective, schematic view of the LED illumination module according to another eighth embodiment of the present invention.

Referring to FIG. 9B, the difference between another eighth embodiment and the seventh embodiment is that: in another eighth embodiment, the stripped light-guiding unit 1h has a second light-guiding microstructure 12h concavely disposed on a central bottom side of the light-guiding body 10h. In addition, the second light-guiding microstructure 12h is concave strip-shaped light-guiding microstructure with a curve shape.

Figure 9C:
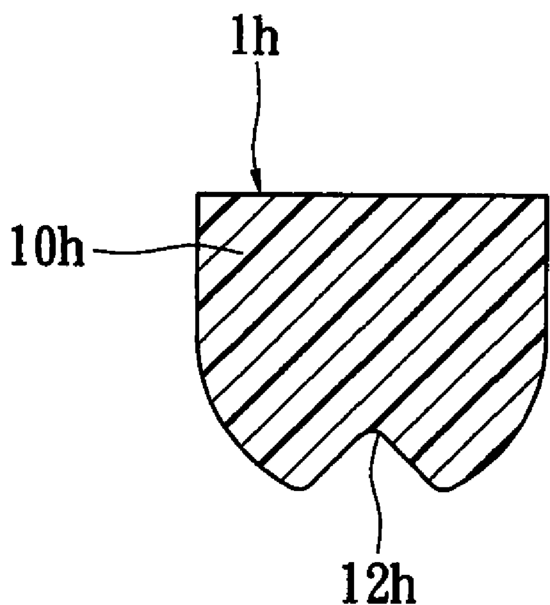
FIG. 9C is a perspective, schematic view of the LED illumination module according to another eighth embodiment of the present invention.

Referring to FIG. 9C, the difference between another eighth embodiment and the seventh embodiment is that: in another eighth embodiment, the stripped light-guiding unit 1h has a second light-guiding microstructure 12h concavely disposed on a central bottom side of the light-guiding body 10h. In addition, the second light-guiding microstructure 12h is concave strip-shaped light-guiding microstructure with a cone shape.

Figure 1A:
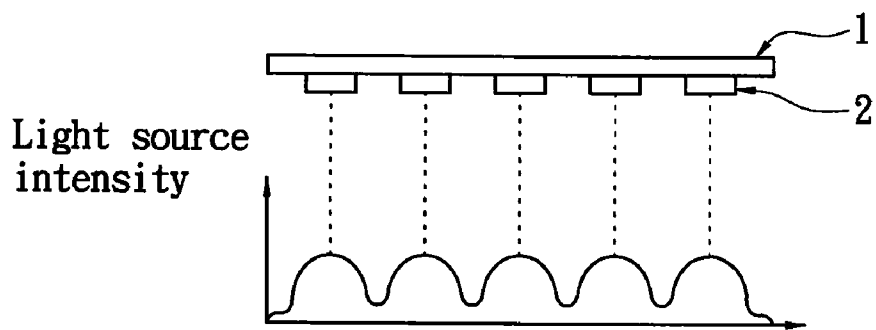
FIG. 1A is a schematic view of the LED lamp showing light source intensity according to the prior art.
Figure 1B:
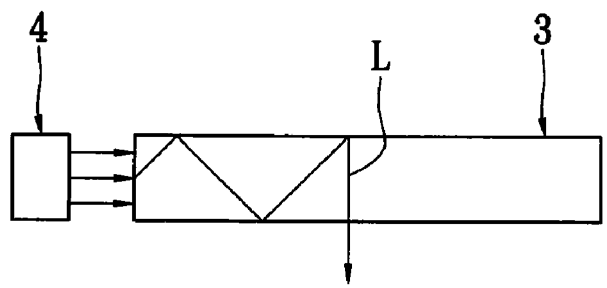
FIG. 1B is a lateral, schematic view of the light-emitting module according to the prior.
Figure 1C:
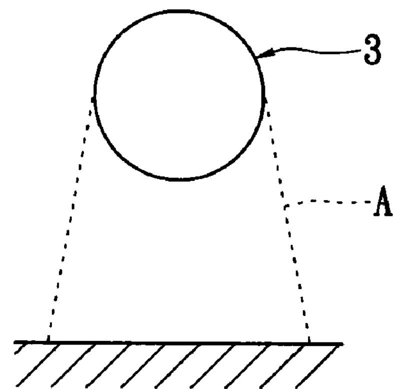
FIG. 1C is a schematic view of the light-emitting module generate a narrow downward light-projecting area according to the prior.
Figure 10:
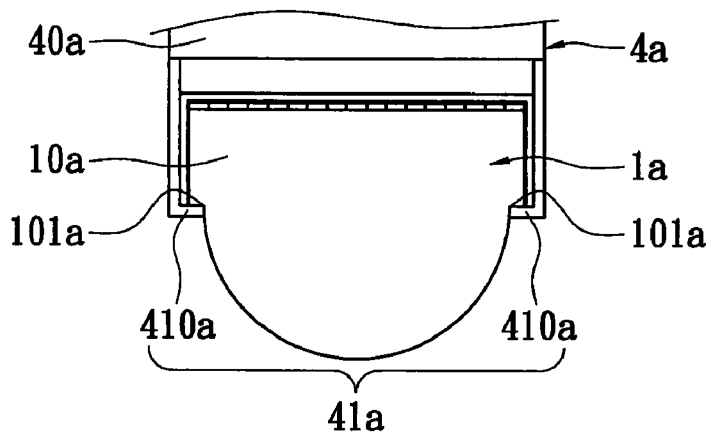
FIG. 10 is a lateral, schematic view of the first type of the LED illumination device according to the present invention.

Referring to FIGS. 1 and 10, the first embodiment of the present invention provides a first type of an LED illumination device for generating uniform stripped light source, including a stripped light-guiding unit 1a, a stripped reflective unit 2a, a light-emitting unit 3a and a fixing unit 4a.

The stripped light-guiding unit 1a has a light-guiding body 10a and a plurality of first light-guiding microstructures 11a disposed on a top side of the light-guiding body 10a. In addition, the light-guiding body 10a has at least two first retaining portions 101a disposed on its two opposite lateral sides, and each first light-guiding microstructure 11a has a first reflective index. Moreover, the stripped reflective unit 2a has a reflective body 20a corresponding to the light-guiding body 10a and a reflective layer 21a formed on an inner surface of the reflective body 20a. In addition, the stripped reflective unit 2a covers one part of the light-guiding body 10a. The first light-guiding microstructures 11a are disposed between the light-guiding body 10a and the reflective layer 21a, and the reflective layer 21a has a second reflective index that is different from the first reflective index. Furthermore, the light-emitting unit 3a has a first light-emitting module 30a disposed beside one end of the light-guiding body 10a.

The fixing unit 4a has at least one fixing body 40a and at least two second retaining portions 41a extended downwards from the fixing body 40a. FIG. 10 only shows one of the two second retaining portions 41a disposed on one end of the light-guiding body 10a. Hence, the position of the stripped light-guiding unit 1a relative to the fixing unit 4a is fixed by matching the two first retaining portions 101a and the two second retaining portions 41a. In other words, referring to FIG. 10, each second retaining portion 41a has at least two retaining pins 410a respectively retaining the two first retaining portions 101a of the light-guiding body 10a in order to fix the position of the stripped light-guiding unit 1a relative to the fixing unit 4a.

Figure 11:
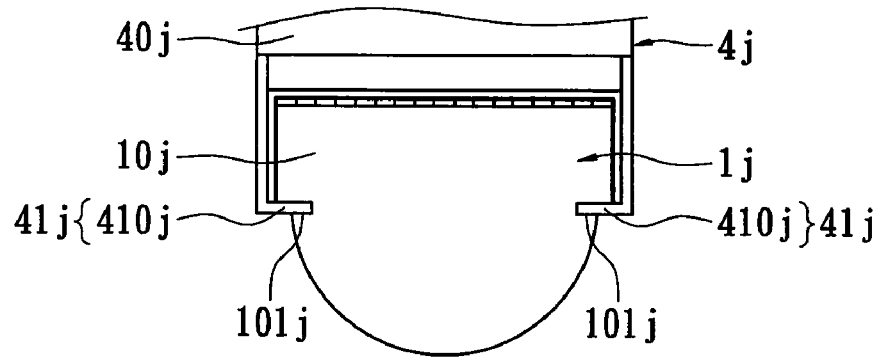
FIG. 11 is a lateral, schematic view of the second type of the LED illumination device according to the present invention.

Referring to FIG. 11, the present invention provides a second type of an LED illumination device. The difference between the second type of the LED illumination device and the first type of the LED illumination device is that: the two first retaining portions 101*j* are two retaining grooves, and the two second retaining portions 41*j* (FIG. 11 only shows one of the two second retaining portions 41*j* disposed on one end of the light-guiding body 10*j*) are two retaining bodies mated with the two retaining grooves. In addition, each second retaining portion 41*j* has at least two retaining pins 410*j* respectively retaining the two first retaining portions 101*j* of the light-guiding body 10*j* in order to fix the position of the stripped light-guiding unit 1*j* relative to the fixing unit 4*j*.

Figure 12:
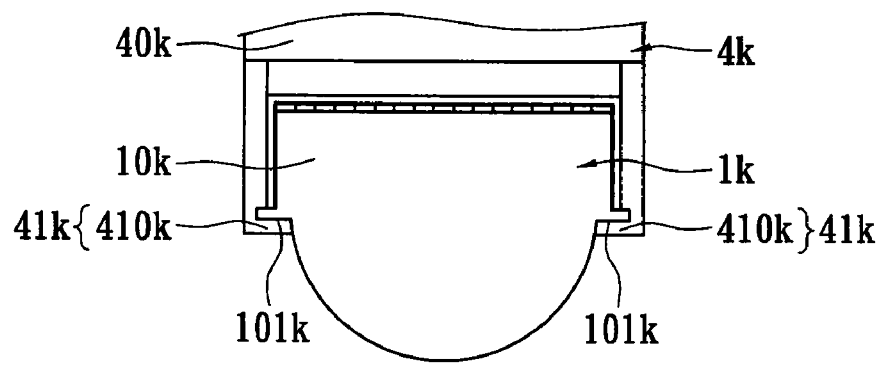
FIG. 12 is a lateral, schematic view of the third type of the LED illumination device according to the present invention.

Referring to FIG. 12, the present invention provides a third type of an LED illumination device. The difference between the third type of the LED illumination device and the other types of the LED illumination device is that: the two first retaining portions 101*k* are two retaining bodies, and the two second retaining portions 41*k* (FIG. 12 only shows one of the two second retaining portions 41*k* disposed on one end of the light-guiding body 10*k*) are two retaining grooves mated with the two retaining bodies. In addition, each second retaining portion 41*k* has at least two retaining pins 410*k* respectively retaining the two first retaining portions 101*k* of the light-guiding body 10*k* in order to fix the position of the stripped light-guiding unit 1*k* relative to the fixing unit 4*k*.

Figure 13:
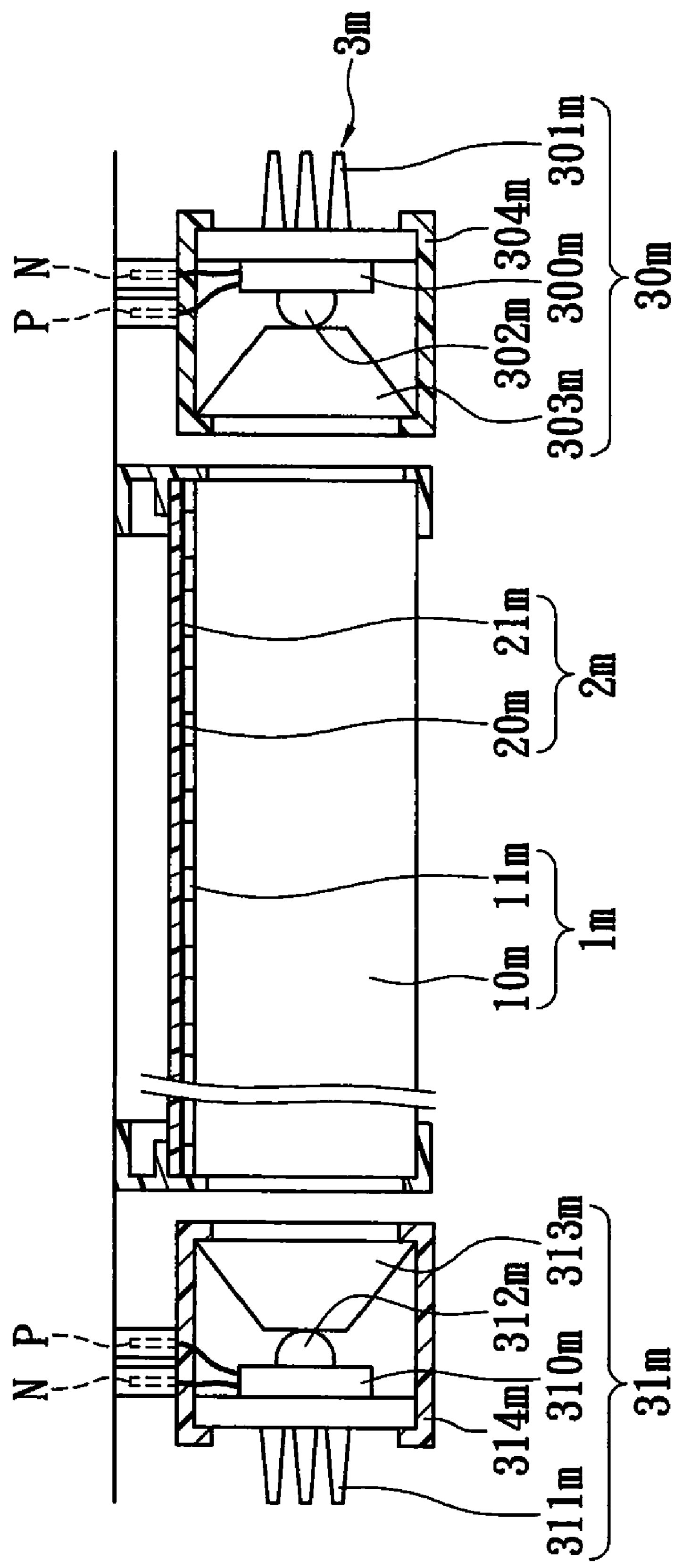
FIG. 13 is a front, schematic view of the LED illumination module according to the ninth embodiment of the present invention.

Referring to FIG. 13, the ninth embodiment of the present invention provides an LED illumination module for generating uniform stripped light source, including a stripped light-guiding unit 1*m*, a stripped reflective unit 2*m* and a light-emitting unit 3*m*. In addition, the light-emitting unit 3*m* has a first light-emitting module 30*m* and a second light-emitting module 31*m* respectively disposed beside one two opposite ends of the light-guiding body 10*m*.

The stripped light-guiding unit 1*m* has a light-guiding body 10*m* and a plurality of first light-guiding microstructures 11*m* disposed on a top side of the light-guiding body 10*m*. The stripped reflective unit 2*m* has a reflective body 20*m* corresponding to the light-guiding body 10*m* and a reflective layer 21*m* formed on an inner surface of the reflective body 20*m*.

In addition, the first light-emitting module 30*m* has a first substrate 300*m*, a first heat-dissipating element 301*m* disposed on a bottom side of the first substrate 300*m*, at least one first light-emitting element 302*m* electrically disposed on the first substrate 300*m* and facing the light-guiding body 10*m*, a first lens 303*m* disposed between the light-guiding body 10*m* and the first light-emitting element 302*m*, and a first casing 304*m* for enclosing the first substrate 300*m*, the first heat-dissipating element 301*m*, the first light-emitting element 302*m* and the first lens 303*m*. Moreover, one side of the first heat-dissipating element 301*m* and one side of the first lens 303*m* are exposed by two opposite openings of the first casing 304*m*. Moreover, the first light-emitting module 30*m* has a positive electrode P and a negative electrode N, so that the first light-emitting module 30*m* is a pluggable light-emitting module.

Moreover, the second light-emitting module 31*m* has a second substrate 310*m*, a second heat-dissipating element 311*m* disposed on a bottom side of the second substrate 310*m*, at least one second light-emitting element 312*m* electrically disposed on the second substrate 310*m* and facing the light-guiding body 10*m*, a second lens 313*m* disposed between the light-guiding body 10*m* and the second light-emitting element 312*m*, and a second casing 314*m* for enclosing the second substrate 310*m*, the second heat-dissipating element 311*m*, the second light-emitting element 312*m* and the second lens 313*m*. Moreover, one side of the second heat-dissipating element 311*m* and one side of the second lens 313*m* are exposed by two opposite openings of the second casing 314*m*. Moreover, the second light-emitting module 31*m* has a positive electrode P and a negative electrode N, so that the second light-emitting module 31*m* is a pluggable light-emitting module.

Figure 14A:
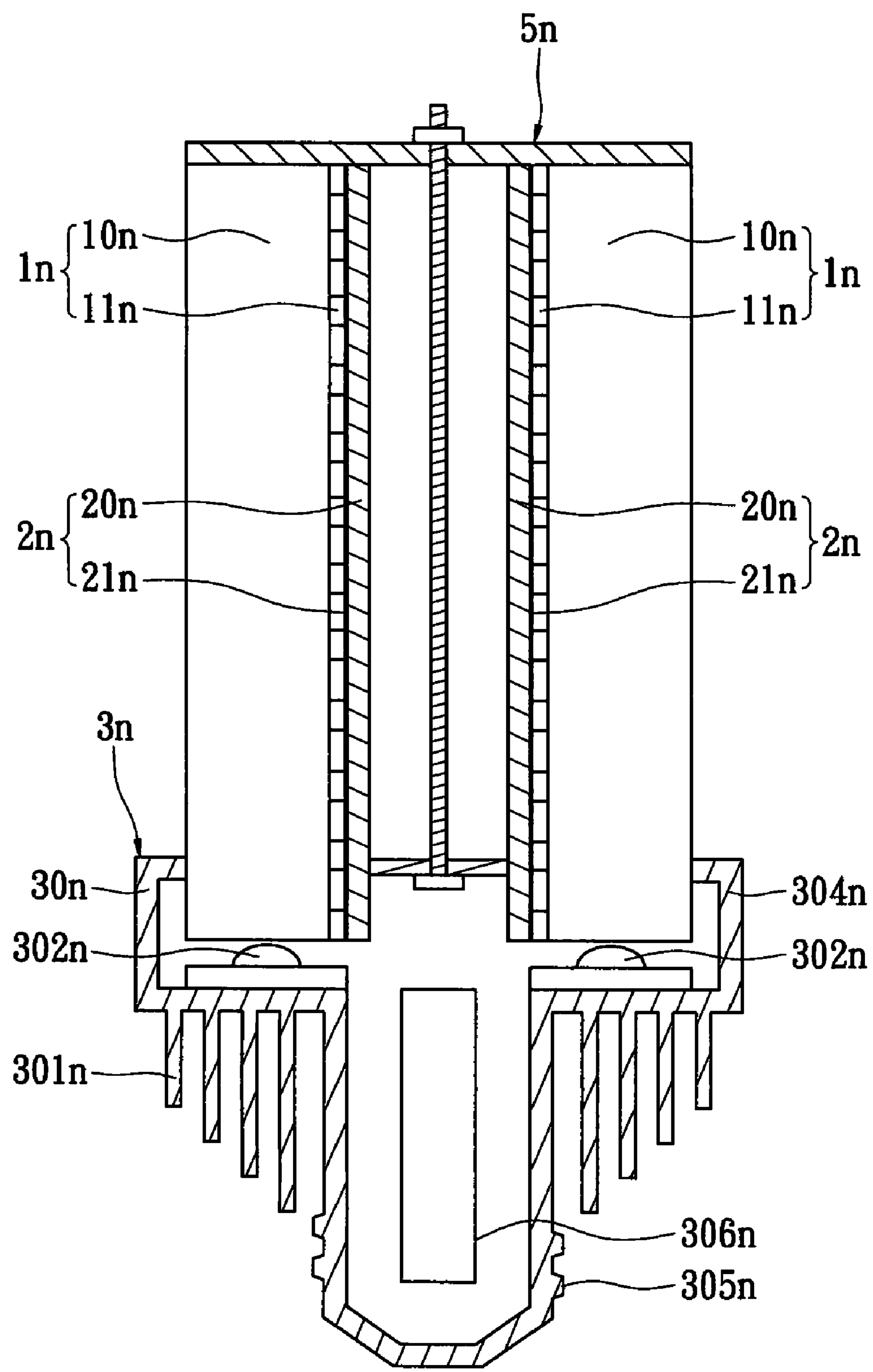
FIG. 14A is a front, cross-sectional, schematic view of the LED illumination module according to the tenth embodiment of the present invention.
Figure 14B:
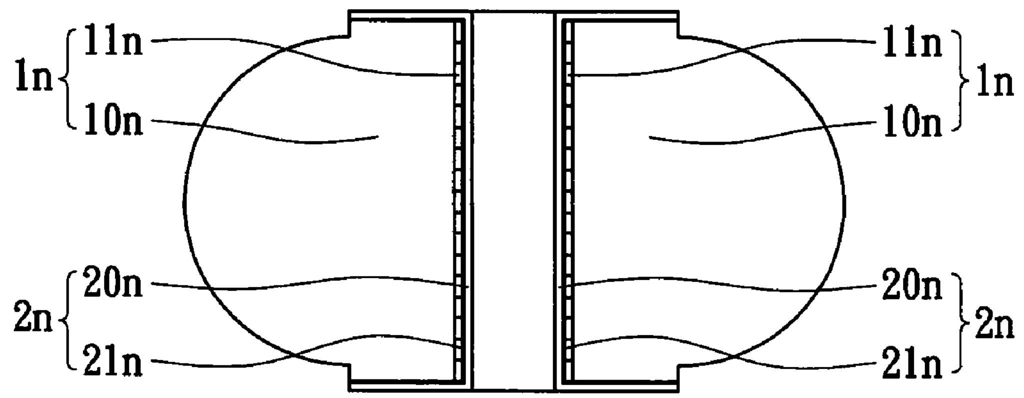
FIG. 14B is a partial, top, schematic view of the LED illumination module according to the tenth embodiment of the present invention.

Referring to FIGS. 14A and 14B, the tenth embodiment of the present invention provides an LED illumination module for generating uniform stripped light source, including two stripped light-guiding units 1*n*, two stripped reflective units 2*n*, a light-emitting unit 3*n* and a fixing unit 5*n* for fixing the two stripped light-guiding units 1*n* or the two stripped reflective units 2*n* together. In addition, the light-emitting unit 3*n* has a first light-emitting module 30*n* disposed beside two ends of the two stripped light-guiding units 1*n*.

Each stripped light-guiding unit 1*n* has a light-guiding body 10*n* and a plurality of first light-guiding microstructures 11*n* disposed on a top side of the light-guiding body 10*n*. The two light-guiding bodies 10*n* are disposed above the light-emitting unit 3*n* back-to-back. Each stripped reflective unit 2*n* has a reflective body 20*n* corresponding to the light-guiding body 10*n* and a reflective layer 21*n* formed on an inner surface of the reflective body 20*n*.

In addition, the first light-emitting module 30*n* has a first casing 304*n*, at least two first light-emitting elements 302*n* disposed in the first casing 304*n* and respectively facing the two light-guiding body 10*n*, a first heat-dissipating element 301*n* extended downwards from the first casing 304*n*, an external screw 305*n* disposed on the bottom side of the first casing 304*n*, and an LED driver 306*n* disposed in the first casing 304*n*.

Figure 15:
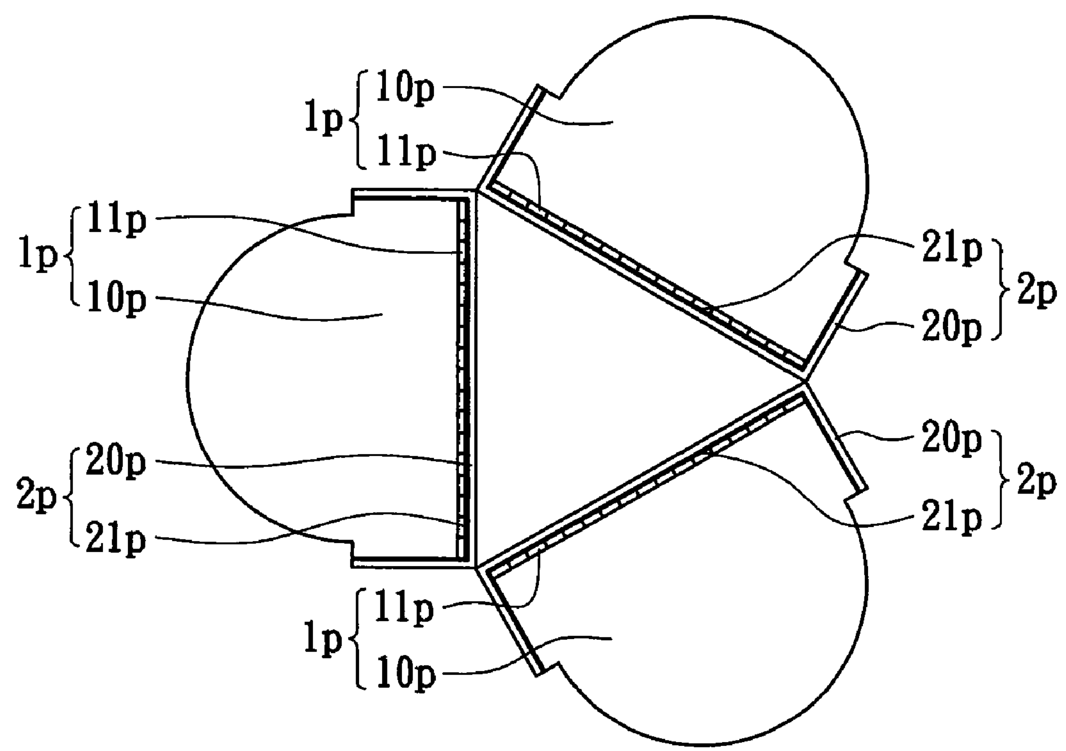
FIG. 15 is a partial, top, schematic view of the LED illumination module according to the eleventh embodiment of the present invention.

Referring to FIG. 15, the eleventh embodiment of the present invention provides an LED illumination module for generating uniform stripped light source, including three stripped light-guiding units 1*p*, three stripped reflective units 2*p* and a light-emitting unit (not shown). In addition, the light-emitting unit is disposed beside three ends of the three stripped light-guiding units 1*p*.

Each stripped light-guiding unit 1*p* has a light-guiding body 10*p* and a plurality of first light-guiding microstructures 11*p* disposed on a top side of the light-guiding body 10*p*. The three light-guiding bodies 10*p* are disposed above the light-emitting unit back-to-back. Each stripped reflective unit 2*p* has a reflective body 20*p* corresponding to the light-guiding body 10*p* and a reflective layer 21*p* formed on an inner surface of the reflective body 20*p*.

Figure 16:
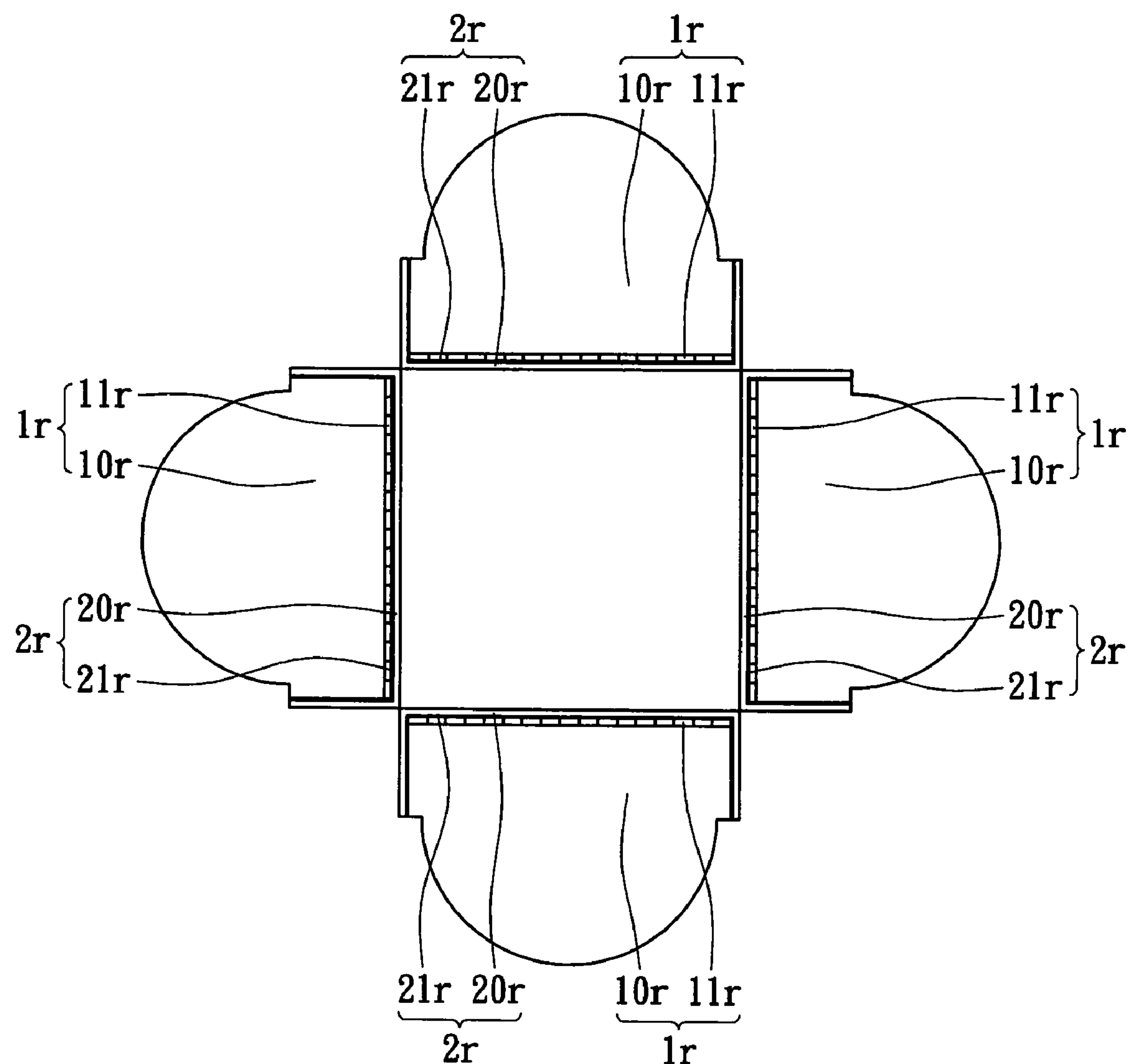
FIG. 16 is a partial, top, schematic view of the LED illumination module according to the twelfth embodiment of the present invention.

Referring to FIG. 16, the twelfth embodiment of the present invention provides an LED illumination module for generating uniform stripped light source, including four stripped light-guiding units 1*r*, four stripped reflective units 2*r* and a light-emitting unit (not shown). In addition, the light-emitting unit is disposed beside four ends of the four stripped light-guiding units 1*r*.

Each stripped light-guiding unit 1*r* has a light-guiding body 10*r* and a plurality of first light-guiding microstructures 11*r* disposed on a top side of the light-guiding body 10*r*. The four light-guiding bodies 10*r* are disposed above the light-emitting unit back-to-back. Each stripped reflective unit 2*r* has a reflective body 20*r* corresponding to the light-guiding body 10*r* and a reflective layer 21*r* formed on an inner surface of the reflective body 20*r*.

Hence, the LED illumination module as an LED light bulb can be assembled by using more than one stripped light-guiding unit and more than one stripped reflective unit.

In conclusion, the prevent invention uses a light-guiding element (the stripped light-guiding unit) and a light-reflecting element (the stripped reflective unit) to guide and reflect light beams generated by the light-emitting unit in order to form uniform and glareless bar-shaped light source.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. An LED illumination device for generating uniform stripped light source, comprising:

a stripped light-guiding unit having a light-guiding body and a plurality of first light-guiding microstructures disposed on a top side of the light-guiding body, wherein the light-guiding body has at least two first retaining portions, and each first light-guiding microstructure has a first reflective index;

a stripped reflective unit having a reflective body corresponding to the light-guiding body and a reflective layer formed on an inner surface of the reflective body, wherein the stripped reflective unit covers one part of the light-guiding body, the first light-guiding microstructures are disposed between the light-guiding body and the reflective layer, and the reflective layer has a second reflective index that is different from the first reflective index;

a fixing unit having at least one fixing body and at least two second retaining portions extended downwards from the fixing body, wherein the position of the stripped light-guiding unit relative to the fixing unit is fixed by matching the two first retaining portions and the two second retaining portions; and a light-emitting unit having a first light-emitting module disposed beside one end of the light-guiding body.

2. The LED illumination device according to claim 1, wherein the first light-guiding microstructures are convex dot-shaped light-guiding microstructures that are integratedly formed on the top side of the light-guiding body, and the sizes of the convex dot-shaped light-guiding microstructures are increased gradually along predetermined directions far away from the first light-emitting module.

3. The LED illumination device according to claim 1, wherein the first light-guiding microstructures are convex dot-shaped light-guiding microstructures that are integratedly formed on the top side of the light-guiding body, and the density of the convex dot-shaped light-guiding microstructures are increased gradually along predetermined directions far away from the first light-emitting module.

4. The LED illumination device according to claim 1, wherein the first light-guiding microstructures are convex dot-shaped light-guiding microstructures that are integratedly formed on the top side of the light-guiding body, and the convex dot-shaped light-guiding microstructures are arranged alternately.

5. The LED illumination device according to claim 1, wherein the first light-guiding microstructures are convex strip-shaped light-guiding microstructures that are integratedly formed on the top side of the light-guiding body, and the convex strip-shaped light-guiding microstructures are parallel to each other.

6. The LED illumination device according to claim 1, wherein the first light-guiding microstructures are convex strip-shaped light-guiding microstructures that are integratedly formed on the top side of the light-guiding body, and the width of each convex strip-shaped light-guiding microstructure is increased gradually along a predetermined direction far away from the first light-emitting module.

7. The LED illumination device according to claim 1, wherein the first light-guiding microstructures are projected on the top side of the light-guiding body.

8. The LED illumination device according to claim 1, wherein the light-guiding body has a plurality of micro protrusions, and the first light-guiding microstructures are respectively disposed on the micro protrusions.

9. The LED illumination device according to claim 1, wherein the stripped light-guiding unit has a plurality of second light-guiding microstructures convexly or concavely disposed on a bottom side of the light-guiding body.

10. The LED illumination device according to claim 1, wherein the two first retaining portions are two retaining grooves, and the two second retaining portions are two retaining bodies mated with the two retaining grooves.

11. The LED illumination device according to claim 1, wherein the two first retaining portions are two retaining bodies, and the two second retaining portions are two retaining grooves mated with the two retaining bodies.

12. The LED illumination device according to claim 1, wherein the first light-emitting module has a first substrate, a first heat-dissipating element disposed on a bottom side of the first substrate, at least one first light-emitting element electrically disposed on the first substrate and facing the light-guiding body, a first lens disposed between the light-guiding body and the first light-emitting element, and a first casing for enclosing the first substrate, the first heat-dissipating element, the first light-emitting element and the first lens, and one side of the first heat-dissipating element and one side of the first lens are exposed by two opposite openings of the first casing.

13. The LED illumination device according to claim 1, wherein the light-emitting unit further comprises a second light-emitting module disposed beside another end of the light-guiding body.

14. The LED illumination device according to claim 13, wherein the first light-emitting module has a first substrate, a first heat-dissipating element disposed on a bottom side of the first substrate, at least one first light-emitting element electrically disposed on the first substrate and facing the light-guiding body, a first lens disposed between the light-guiding body and the first light-emitting element, and a first casing for enclosing the first substrate, the first heat-dissipating element, the first light-emitting element and the first lens, and one side of the first heat-dissipating element and one side of the first lens are exposed by two opposite openings of the first casing, wherein the second light-emitting module has a second substrate, a second heat-dissipating element disposed on a bottom side of the second substrate, at least one second light-emitting element electrically disposed on the second substrate and facing the light-guiding body, a second lens disposed between the light-guiding body and the second light-emitting element, and a second casing for enclosing the second substrate, the second heat-dissipating element, the second light-emitting element and the second lens, and one side of the second heat-dissipating element and one side of the second lens are exposed by two opposite openings of the second casing.

* * * * *